US009280813B2

(12) United States Patent
Liu et al.

(10) Patent No.: US 9,280,813 B2
(45) Date of Patent: Mar. 8, 2016

(54) BLUR MEASUREMENT (76) Inventors: Debing Liu, Beijing (CN); Zhibo Chen, Beijing (CN); Xiaodong Gu, Beijing (CN)

(*) Notice: Subject to any disclaimer, the term of this patent is extended or adjusted under 35 U.S.C. 154(b) by 0 days.

(21) Appl. No.: 14/372,316

(22) PCT Filed: Jan. 20, 2012

(86) PCT No.: PCT/CN2012/070652
§ 371 (c)(1),
(2), (4) Date: Jul. 15, 2014

(87) PCT Pub. No.: WO2013/107037
PCT Pub. Date: Jul. 25, 2013

(65) Prior Publication Data
US 2014/0328550 A1 Nov. 6, 2014

(51) Int. Cl.
*G06K 9/52* (2006.01)
*G06T 7/00* (2006.01)
*H04N 17/02* (2006.01)
*G06T 5/00* (2006.01)

(52) U.S. Cl.
CPC .............. *G06T 7/0002* (2013.01); *G06T 5/003* (2013.01); *G06T 7/0081* (2013.01); *H04N 17/02* (2013.01); *G06T 2207/20021* (2013.01); *G06T 2207/20104* (2013.01); *G06T 2207/20144* (2013.01); *G06T 2207/30168* (2013.01)

(58) Field of Classification Search
CPC ..... G06T 5/003; G06T 7/0002; G06T 7/0081; G06T 2207/20021; G06T 2207/20104; G06T 2207/20144; G06T 2207/30168; H04N 17/02
USPC ......................................... 382/206, 282, 286
See application file for complete search history.

(56) References Cited

U.S. PATENT DOCUMENTS

| 6,332,034 | B1 * | 12/2001 | Makram-Ebeid et al. ..... 382/128 |
| 6,996,272 | B2 * | 2/2006 | Chen et al. ..................... 382/173 |
| 7,809,189 | B2 * | 10/2010 | Cheng et al. .................. 382/173 |
| 8,175,384 | B1 * | 5/2012 | Wang ............................ 382/173 |
| 8,249,377 | B1 * | 8/2012 | Banner et al. ................. 382/255 |
| 2004/0258308 | A1 * | 12/2004 | Sadovsky et al. ............. 382/190 |
| 2006/0171569 | A1 | 8/2006 | Budagavi |
| 2007/0286520 | A1 | 12/2007 | Zhang et al. |
| 2009/0110272 | A1 * | 4/2009 | Wacey ................ G06F 17/3025 382/165 |
| 2009/0135270 | A1 * | 5/2009 | Makino et al. ............. 348/222.1 |

(Continued)

FOREIGN PATENT DOCUMENTS

| CN | 1487749 | 4/2004 |
| CN | 1525387 | 9/2004 |
| CN | 102104728 | 6/2011 |
| WO | WO2010102913 | 9/2010 |
| WO | WO2012000137 | 1/2012 |

OTHER PUBLICATIONS

Search Rept: Nov. 1, 2012.

*Primary Examiner* — Yubin Hung
(74) *Attorney, Agent, or Firm* — Robert D. Shedd; Paul P. Kiel; Xiaoan Lu (57) ABSTRACT An image is partitioned into a foreground area, a background area, and optionally a transitional area. The partitioning may be pre-defined, or it may be based on user inputs and configuration data. The partitioning may also be refined based on an initial partitioning. Blur measures are determined respectively for the partitioned areas. A blur measure for the whole image can then be determined from a weighted average of the blur measures for the partitioned areas. The blur measure for the image can be used in a video quality monitor.

20 Claims, 5 Drawing Sheets

(56) References Cited

U.S. PATENT DOCUMENTS

2011/0013039 A1* 1/2011 Aisaka et al. ............. 348/222.1
2011/0164152 A1* 7/2011 Hong et al. .................. 348/239
2011/0235905 A1* 9/2011 Yokokawa .................... 382/165
2011/0261225 A1* 10/2011 Niinami ..................... 348/223.1
2013/0129233 A1* 5/2013 Schiller et al. ............... 382/228

* cited by examiner

BLUR MEASUREMENT

This application claims the benefit, under 35 U.S.C. §365 of International Application PCT/CN2012/070652, filed Jan. 20, 2012, which was published in accordance with PCT Article 21(2) on Jul. 25, 2013 in English.

TECHNICAL FIELD

This invention relates to blur measurement, and more particularly, to a method and an apparatus for determining a blur metric in response to both out-of-focus blurs and blurriness artifacts from compression.

BACKGROUND

Blurriness is one of the most prominent features affecting image/video perceptual quality. Accurately estimating the blur level of an image/video is important to accurately estimate the quality.

Based on how blurriness is generated, it may be classified into three main categories: out-of-focus blur, motion blur, and blurriness artifact from compression (denoted as compression blur hereinafter).

SUMMARY

According to a general aspect, an image having a foreground area and a background area is received and blur measures are determined respectively for the foreground area and the background area. A blur measure for the image is then determined in response to the blur measures for the foreground area and the background area.

According to another general aspect, an image having a foreground area and a background area is received. An area of the image is initially designated to be the foreground or background area. A blur measure for a group of blocks adjacent to the foreground or background area is determined. Then a difference between the blur measure for the group of blocks and the blur measure for the foreground or background area is determined. The difference is compared with a threshold, and the foreground or the background area is adjusted to include the group of blocks.

According to another general aspect, an image is partitioned into a foreground area, a transitional area, and a background area. Blur measures are determined respectively for the foreground area, the transitional area, and the background area. A blur measure for the image is then determined in response to the blur measures for the foreground area, the transitional area, and the background area.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

The out-of-focus blur and compression blur have different impacts on human perception. An out-of-focus blur is often located in the background of a picture, while the compression blur is often distributed over the entire image. Generally the out-of-focus blur appears natural while the compression blur appears annoying to human perception. According to the present principles, a new blur metric, and a method and an apparatus for determining the new blur metric are proposed to consider different influences from the out-of-focus blur and the compression blur.

Most existing video compression standards, for example, H.264 and MPEG-2, use a macroblock (MB) as the basic encoding unit. Thus, the following embodiments use a macroblock as the basic processing unit. However, the principles may be adapted to use a block at a different size, for example, an 8×8 block, a 16×8 block, a 32×32 block, and a 64×64 block.

Figure 1:
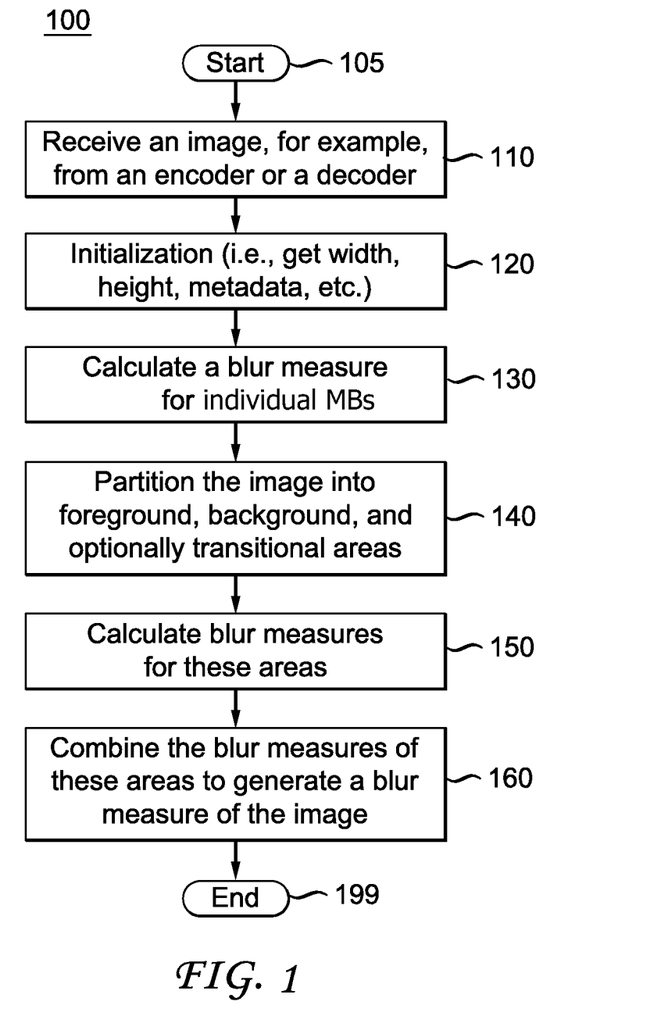
FIG. 1 is a flow diagram depicting an example for calculating a blur measure for an image, in accordance with an embodiment of the present principles.

FIG. 1 illustrates an exemplary method 100 for calculating a blur metric for an image. Method 100 includes a start block 105 that passes control to a function block 110. An image is received in block 110. The image may be reconstructed from an encoder or decoded from a decoder, and it may contain different types of blurs. Initialization is performed in block 120. The initialization may include, for example, getting the width and height of the image and obtaining the program metadata associated with the image. A local blur measure is calculated for individual macroblocks in block 130. Blurriness for a group of macroblocks can then be calculated from the local blur measures, using averaging or other mathematical functions. In block 140, the image is divided into a background area, a foreground area, and optionally a transitional area. Blur metrics are calculated respectively for the areas in block 150 and in block 160 the blur level of the whole image is obtained. Control is then passed to an end block 199. Steps for initialization, local blur measure calculation, image partitioning, and blur measure calculation are described in further detail in the following.

Initialization

The initialization step (120) may obtain the resolution of the image and associated program metadata. The program metadata may provide information on the content type, for example, whether the program is a newscast, a sports event, or a movie, and other related information. The content type may provide additional hints in determining the foreground area and the background area.

The initialization step may also process the image, for example, excluding the black margins from the image. The black margins generally have little impacts on the image perceptual quality and may affect the accuracy of the calculated blur metric, so it may be excluded in the blur calculation. The black marginal areas may be specified by the configuration, such as top and bottom six macroblock rows and left and right one macroblock column.

Local Blur Measure Calculation

Figure 2:
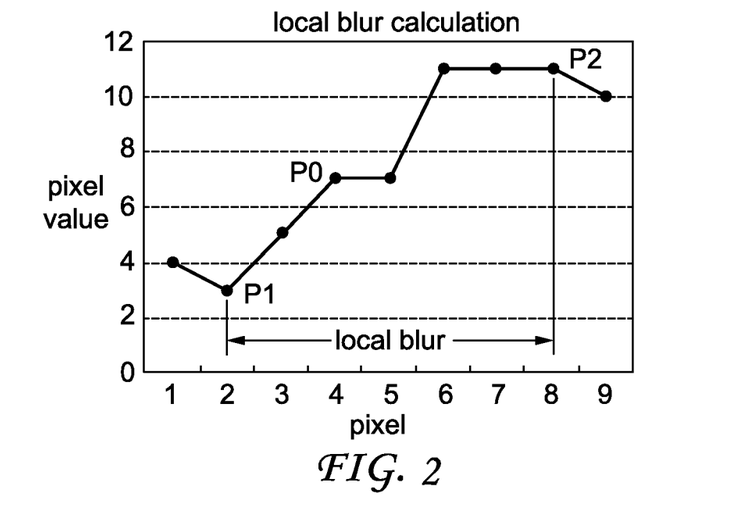
FIG. 2 is a pictorial representation of the principle of calculating a local blur measure.

A local blur measure is calculated for individual macroblocks in block 130. Different local blur calculation methods may be used. An exemplary local blur calculation method is illustrated in FIG. 2, wherein P0 is the center of the macroblock, and P1 and P2 are the positions with local minimum and maximum luminance values along horizontal (or vertical) direction. The distance between P1 and P2 is the local blur value, (i.e., 6).

This local blur measure is reliable in regions with medium texture, but less accurate in the regions with highly complex texture or very plain texture. Therefore, when calculating a blur measure for a region with multiple macroblocks, macroblocks with complex texture or very plain texture may be excluded from the blur level calculation. Accordingly, the standard deviation of the pixels in a macroblock is calculated. If the standard deviation is not in the range of [2, 20], the macroblock is excluded from blur measure calculation for the foreground, transitional, and background areas. That is, the local blur measures of corresponding macroblocks with medium texture are combined, for example, averaged or weighted averaged, to calculate the blur level for the partitioned areas. The range of the standard deviation may be adjusted in different implementations, for example, it may be adaptive to the resolution or content type of the images.

Other local blur measure calculation methods can also be used. For example, it can be calculated in a DCT domain. In another example, it can be calculated based on the edge type and sharpness analysis using wavelet transform.

Image Partitioning

Figure 3:
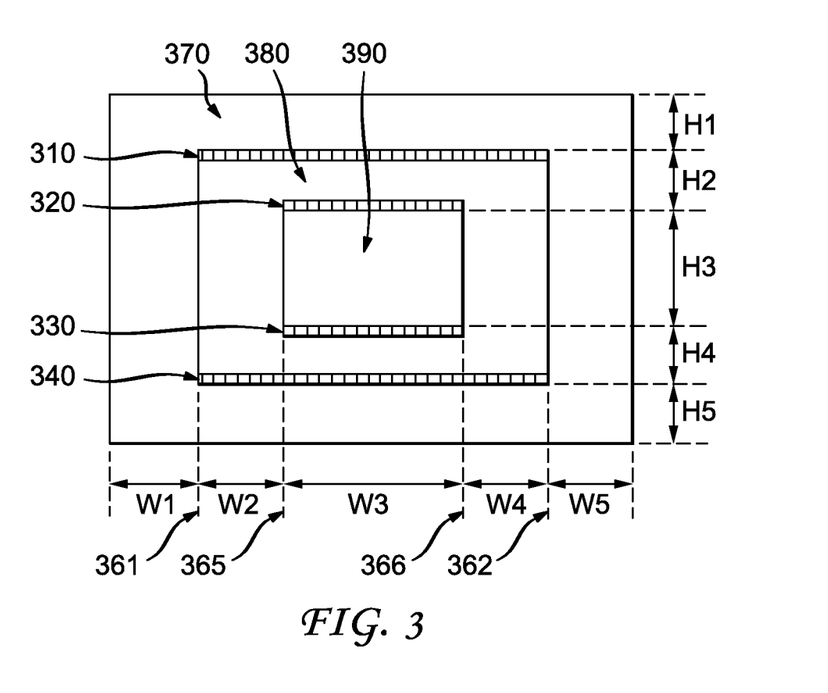
FIG. 3 is a pictorial representation of image partitioning.

FIG. 3 illustrates an example for partitioning an image into a background area 370, a transitional area 380, and a foreground area 390. Parameters W1-W5 and H1-H5 are used to define these three areas as shown in FIG. 3. The out-of-focus blur is often located in the background area. A transitional area is between the background and foreground and it may or may not contain out-of-focus blur.

In one embodiment, the partitioning, i.e., parameters W1-W5 and H1-H5, is specified by configuration data. The configuration may be a set of pre-defined values, which may be provided and adjusted by user inputs. The configuration may be adaptive to the property of the image, for example, the content type of the image. In one example, if the image is from newscast, the anchorperson is usually in the foreground and the location may be determined depending on the TV channel.

In one example, we define the width and height of the image as W and H respectively. W1-W5 are set as ⅙W, ⅙W, ⅓W, ⅙W, and ⅙W, and H1-H5 are set as ⅙H, ⅙H, 5/12H, 2/12H, and 1/12H. Note in this example H5 is lower than others since the bottom part of the picture often belongs to the foreground.

Figure 4:
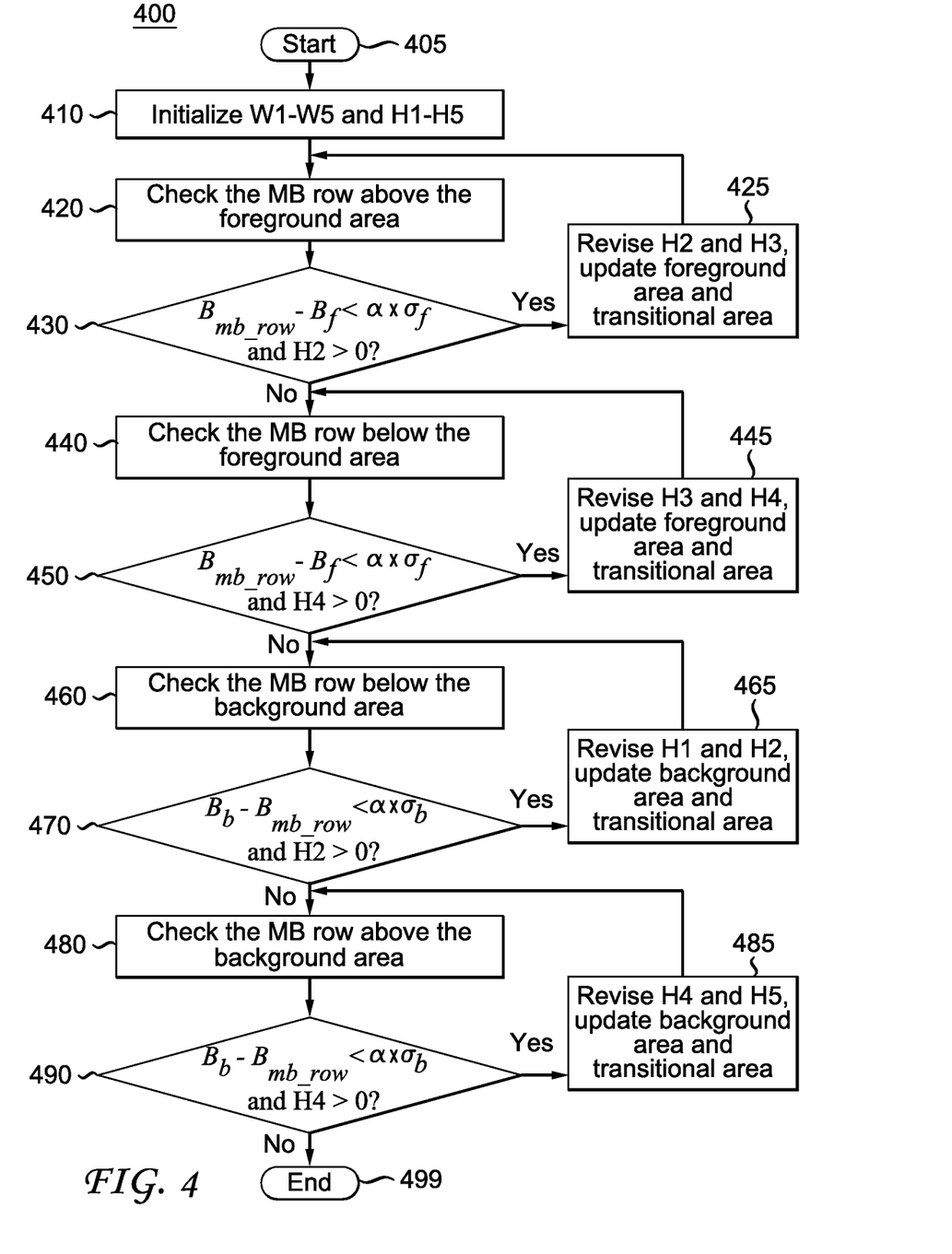
FIG. 4 is a flow diagram depicting an example for adjusting image partitioning, in accordance with an embodiment of the present principles.

In another embodiment, a set of initial parameters are used to form an initial partitioning, then the partitioning is refined automatically. FIG. 4 illustrates an exemplary method 400 for refining parameters H1-H5.

Method 400 starts with a start block 405 that passes control to a function block 410. Parameters H1-H5 are initialized in block 410. In one example, H1-H5 are initialized as 1/12H, ⅓H, ¼H, ⅓H, and 0. Note in this example the height of the transitional area is initialized to be higher than that of other areas. In the next, the macroblocks in the transitional area will be examined and may be classified as belonging to the background or the foreground area.

The macroblock row (320) above the foreground is examined in block 420. By averaging corresponding local blur measures, blur measures for the foreground area and the macroblock row 320 are calculated as $B_f$ and $B_{mb\_row}$ respectively. As discussed above, when the local blur measure as described in FIG. 2 is used, macroblocks with highly complex or very plain texture may be excluded from calculating $B_f$ and $B_{mb\_row}$ for accuracy. If all macroblocks in a macroblock row are excluded, this macroblock row will be skipped and a subsequent macroblock row will be used for decision. If all macroblocks in the foreground area are excluded, the automatic refinement is terminated. Similarly, the reliability of the local blur measures should be considered when calculating the blur measures for other regions.

A standard deviation for the blur, denoted as a blur deviation, in the foreground is calculated as $\sigma_f$. In block 430, it is checked whether $B_{mb\_row} - B_f < \alpha^* \sigma_f$, where $\alpha$ is a constant. $\alpha$ is set to 1 in one embodiment and it may be adjusted according to the applications. If the inequality holds, the macroblock row 320 is classified as belonging to the foreground area. Consequently, parameters H2 and H3 are revised and the foreground and transitional areas are updated in block 425. More particularly, H3 is increased by a macroblock row and H2 is decreased by a macroblock row. Control is then passed to block 420 from block 425. Parameters $B_f$, $B_{mb\_row}$, and $\sigma_f$ are updated and an additional macroblock row will be checked. If the inequality does not hold or H2 equals to 0, control is passed to block 440.

In block 440, the macroblock row (330) below the foreground is examined. Similarly, $B_f$, $B_{mb\_row}$, and $\sigma_f$ are calculated. It is checked in block 450 whether $B_{mb\_row} - B_f < \alpha^* \sigma_f$ and H4 is greater than 0. If both conditions are satisfied, the macroblock row is classified as belonging to the foreground area. Consequently, H3 and H4 are revised and the foreground area and the transitional area are updated in block 445. More particularly, H3 is increased by a macroblock row and H4 is decreased by a macroblock row. Control is then passed to block 440 from block 445. If the inequality $B_{mb\_row} - B_f < \alpha^* \sigma_f$ does not hold or H4 equals to 0, control is passed to 460.

In block 460, the macroblock row (310) below the background area is examined. Blur measures for the background area and the macroblock row 310 are calculated as $B_b$ and $B_{mb\_row}$ respectively. A standard deviation for blur in the background is calculated as $\sigma_b$. In block 470, it is checked whether $B_b - B_{mb\_row} < \alpha^* \sigma_b$ and H2 is greater than 0. If both conditions are satisfied, the macroblock row 310 is more blurred than the background area and it is classified as belonging to the background area. Consequently, H1 and H2 are revised and the background and transitional areas are updated. More particularly, H1 is increased by a macroblock row and H2 is decreased by a macroblock row. Control is then passed to block 460. Parameters $B_b$, $B_{mb\_row}$, and $\sigma_b$ are updated and an additional macroblock row below 340 will be checked. If the inequality $B_b - B_{mb\_row} < \alpha^* \sigma_b$ does not hold or H2 equals to 0, control is passed to block 480.

In block 480, the macroblock row (340) above the background is examined. $B_b$, $B_{mb\_row}$, and $\sigma_b$ are calculated. It is checked in block 490 whether $B_b - B_{mb\_row} < \alpha^* \sigma_b$ and H4 is greater than 0. If both conditions are satisfied, the macroblock row is classified as belonging to the background area. Consequently, H4 and H5 are revised and the background area and the transitional area are updated in block 485. More particularly, H5 is increased by a macroblock row and H4 is decreased by a macroblock row. Control is then passed to block 480. If the inequality $B_b - B_{mb\_row} < \alpha^* \sigma_b$ does not hold or H4 equals to 0, control is passed to end block 499.

FIG. 4 describes how H1-H5 can be refined automatically. Similarly, parameters W1-W5 can be refined. In a particular embodiment, W1-W5 are initialized as $\frac{1}{12}$W, $\frac{1}{3}$W, $\frac{1}{6}$W, $\frac{1}{3}$W, and $\frac{1}{12}$W, and the macroblock columns left/right to the foreground/background area will be examined and may be determined as belonging to the foreground/background area.

In method 400, the macroblock row (320) above the foreground is first examined, followed by the macroblock row (330) below the foreground, the macroblock row (310) below the background area, and the macroblock row (340) above the background area. This particular order is to obtain a foreground area as large as possible so as to make the image blur calculation more stable. Other orders can be used, for example, 330, 320, 340 and 310.

In method 400, a macroblock row or a macroblock column in the transitional area is examined to determine whether it should belong to the foreground or background area. Note that when considering the macroblock rows 320 and 330, only macroblocks between columns 365 and 366 are considered. In another embodiment, the macroblock row can be extended, for example, to include macroblocks between columns 361 and 362. In another implementation, an L-shaped group of macroblocks (i.e., a macroblock row+a macroblock column) can be used to refine the partitioning. To increase samples, in another embodiment, multiple rows or columns of macroblocks can be examined in each iteration.

To speed up the calculation, local blur measure calculation may be skipped for some macroblocks. For example, local blur measures are calculated for every other macroblocks, horizontally and vertically, and the blur measures for the macroblock row and the foreground/background are averaged over these macroblocks.

Two inequality equations: $B_{mb\_row} - B_b < \alpha * \sigma_f$ and $B_b - B_{mb\_row} < \alpha * \sigma_1$, are used when refining image partitioning. The conditions assume the blur metric increases as the blurriness gets stronger, and the scaling factor is tuned for the local blur metric described in FIG. 2. When the values associated with other blur metrics does not correspond to the one illustrated in FIG. 2, these blur metrics should be converted first in order to apply the present principles, or the inequality condition and the scaling factor $\alpha$ should be tuned accordingly. As discussed above, the reliability of these local blur measures should also be considered when partitioning the image.

For an image with out-of-focus blur, its blur in the background should be much stronger than that in the foreground and the standard deviation of the blur in the foreground or background should be low. Therefore, these two inequality conditions can effectively identify the foreground from the background.

All the blocks in the initial transitional area may be grouped into the foreground or background, i.e., H2=H4=W2=W4=0. That is, the image may be partitioned into two areas only: a background area and a foreground area. It is also possible that the entire image is classified as a background area or a foreground area.

Blur Measure Generation

The local blur measures for the macroblocks in the foreground, the background, and the transitional area are averaged separately to obtain blur measure for these partitioned areas. When there is no transitional area (H2=H4=W2=W4=0), the blur of the transitional area is set to 0. Similarly, when there is no background area or foreground area, the blur for the background or foreground is set to 0.

The blur of the image is calculated as $$B = W_b * B_b + w_t * B_t + w_f * B_f, w_b + w_t + w_f = 1,$$

wherein B is the blur level of the whole image, $B_b$, $B_t$, and $B_f$ are the blur measures for the background, transitional, and foreground areas respectively, and $w_b$, $w_t$, and $w_f$ are the weights for different blurs. In one example, when $B_t$ is not 0, $w_b$, $w_t$, and $w_f$ are set to 0.1, 0.2, and 0.7 respectively. In another example, when $B_t$ is 0, $w_b$, $w_t$, and $w_f$ are set to 0.2, 0, and 0.8 respectively. The weighting factors may also consider the size of the partitioned areas. In more complex implementation, the image property, for example, smoothness and textureness, may be used in designing the weighting factors. The weights may be adjusted according to the applications.

When the blur metric according to the present principles differentiate the compression blur and out-of-focus blur, it can also be used to measure the blur level when only compression blur occurs in the image. When the image has no out-of-focus blur, the image partitioning may detect it and all macroblocks belong to the foreground area, that is $W_b = W_t = 0$ and $B = w_f * B_f = B_f$. In another embodiment, the image may still be partitioned into two or three areas even if there is only compression blur. Assuming it is divided into three areas, the blurs in all three areas are caused by compression and generally have similar values, that is $B_b \approx B_t \approx B_f$ and the blur metric of the image becomes $$B = W_b * B_f + w_t * B_f + w_f * B_f \approx (w_b + w_t + w_f) * B_f = B_f.$$

In both scenarios of image partitioning, the calculated blur level properly reflects the compression blur.

Note that the weighting factors for the background and transitional areas are smaller than that of the foreground area. When there are both out-of-focus blurs and compression blurs, the calculated blur level for the entire image will be smaller than if all blurs are regarded as compression blurs.

Figure 5:
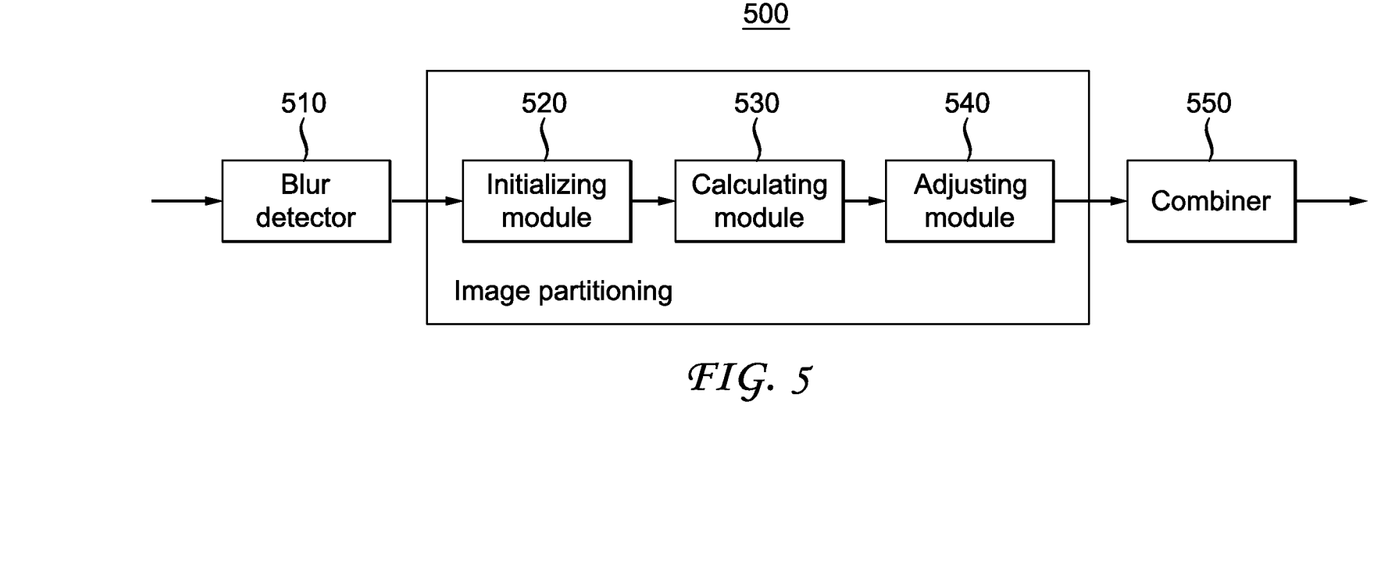
FIG. 5 is a block diagram depicting an example of a video quality monitor that may be used with one or more implementations.

FIG. 5 depicts a block diagram of an exemplary blur measurement apparatus that can be used to generate the blur measure for the image described in FIG. 1. The input includes the image and its metadata. Blur detector 510 calculates local blur measures for individual macroblocks. Initializing module 520 processes the image and obtains parameters such as the image width and height. It also forms an initial image partitioning. Calculating module 530 examines whether a group of blocks in the transitional area, for example, a macroblock row or a macroblock column, should be classified into the foreground or background. If the group of blocks should belong to the foreground or background, adjusting module 540 updates the image partitioning accordingly. After image partitioning is completed, a blur measure for the whole image is determined at combiner 550 in response to the blur measurements for these areas.

When the present principles are used to measure video quality, blur measure for all images in the video may be calculated and then combined. The blur measure for an image/video may also be considered jointly with other distortion or artifact metrics to provide an overall quality metric.

Figure 6:
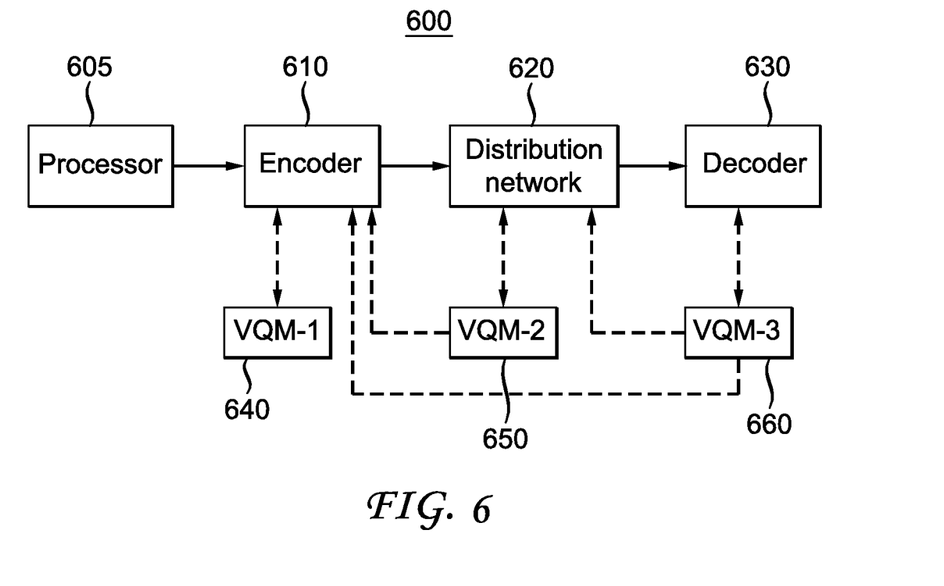
FIG. 6 is block diagram depicting an example of a video processing system that may be used with one or more implementations.

Referring to FIG. 6, a video transmission system or apparatus 600 is shown, to which the features and principles described above may be applied. A processor 605 processes the video and the encoder 610 encodes the video. The bitstream generated from the encoder is transmitted to a decoder 630 through a distribution network 620. A video quality monitor may be used at different stages.

In one embodiment, a video quality monitor 640 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 650 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 660 may be used by a user device. For example, when a user searches videos in Internet, a search result may return many videos or many links to videos corresponding to the requested video content. The videos in the search results may have different quality levels. A video quality monitor can calculate quality metrics for these videos and decide to select which video to store.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, blur detection, blur measurement, quality measuring, and quality monitoring. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a game console, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM").

The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
    receiving an image having a foreground area and a background area;
    determining respective blur measures for the foreground area and the background area; and
    determining a blur measure indicating image quality for the image in response to the blur measures for the foreground area and the background area,
    wherein the determining the blur measure for the image is based on a weighted average of the blur measures for the foreground area and the background area, and
    wherein a weighting factor for the background area is smaller than a weighting factor for the foreground area.

2. The method of claim 1, further comprising:
    generating a quality measure in response to the blur measure for the image; and
    based on the quality measure, performing at least one of adjusting a bitstream containing the image, creating a new bitstream containing the image, adjusting parameters of a distribution network used to transmit the bitstream, determining whether to keep the bitstream, and error concealment at a decoder.

3. The method of claim 2, further comprising determining a transitional area in the image and determining a blur measure for the transitional area, wherein the determining the blur measure for the image is further in response to the blur measure for the transitional area.

4. The method of claim 2, further comprising:
determining the foreground area and the background area in response to pre-determined values.

5. The method of claim 2, further comprising:
determining the foreground area and the background area in response to at least one of a user input and metadata associated with the image.

6. The method of claim 2, further comprising:
initially designating an area of the image to be the foreground area;
determining a blur measure for a group of blocks adjacent to the foreground area;
determining a difference between the blur measure for the group of blocks and the blur measure for the foreground area;
comparing the difference with a threshold; and
adjusting the foreground area to include the group of blocks responsive to the comparison between the difference and the threshold.

7. The method of claim 6, wherein the group of blocks is at least one of a row of blocks and a column of blocks adjacent to the foreground area.

8. The method of claim 6, wherein the threshold is based on a blur deviation of the foreground area.

9. The method of claim 2, further comprising:
initially designating an area of the image to be the background area;
determining a blur measure for a group of blocks adjacent to the background area;
determining a difference between the blur measure for the group of blocks and the blur measure for the background area;
comparing the difference with a threshold; and
adjusting the background area to include the group of blocks responsive to the comparison between the difference and the threshold.

10. The method of claim 9, wherein the group of blocks is at least one of a row of blocks and a column of blocks adjacent to the background area.

11. The method of claim 9, wherein the threshold is based on a blur deviation of the background area.

12. The method of claim 2, further comprising:
receiving the image, the image being one of a reconstructed image from an encoder and a decoded image from a decoder.

13. An apparatus, executed by a computer, comprising:
an input configured to receive an image having a foreground area and a background area; and
one or more processors configured to:
determine a blur measure indicating image quality for the image in response to a weighted average of blur measures for the foreground area and the background area,
wherein a weighting factor for the background area is smaller than a weighting factor for the foreground area.

14. The apparatus of claim 13, wherein the one or more processors are further configured to:
generate a quality measure in response to the blur measure for the image; and
based on the quality measure, perform at least one of adjusting a bitstream containing the image, creating a new bitstream containing the image, adjusting parameters of a distribution network used to transmit the bitstream, determining whether to keep the bitstream, and error concealment at a decoder.

15. The apparatus of claim 14, wherein the one or more processors are further configured to:
determine a difference between a blur measure for a group of blocks and a blur measure for the foreground area or the background area; and
adjust the foreground area or the background area to include the group of blocks based on the difference.

16. The apparatus of claim 15, wherein the difference is compared with a threshold, the threshold based on a blur deviation of the foreground area or the background area.

17. The apparatus of claim 14,
wherein the one or more processors are further configured to generate respective local blur measures for a plurality of blocks of the image, and wherein the blur measure for the foreground area or the background area is determined in response to the local blur measures.

18. The apparatus of claim 14, wherein the one or more processors are further configured to partition the image to contain a transitional area and to determine the blur measure for the image in response to a blur measure for the transitional area.

19. The apparatus of claim 14, wherein the image is a reconstructed image from an encoder or a decoded image from a decoder.

20. A non-transitory computer readable medium having stored thereupon instructions for causing one or more processors to collectively perform:
receiving an image having a foreground area and a background area;
determining respective blur measures for the foreground area and the background area; and
determining a blur measure indicating image quality for the image in response to the blur measures for the foreground area and the background area,
wherein the determining the blur measure for the image is based on a weighted average of the blur measures for the foreground area and the background area, and
wherein a weighting factor for the background area is smaller than a weighting factor for the foreground area.

* * * * *